United States Patent [19]

Widder et al.

[11] Patent Number: 4,504,652

[45] Date of Patent: Mar. 12, 1985

[54] POLYESTER PLASTICIZER

[75] Inventors: Charles R. Widder, Marysville; Don S. Wozniak, Powell, both of Ohio

[73] Assignee: Sherex Chemical Company, Inc., Dublin, Ohio

[21] Appl. No.: 603,591

[22] Filed: Apr. 25, 1984

Related U.S. Application Data

[63] Continuation-in-part of Ser. No. 526,598, Aug. 26, 1983, abandoned.

[51] Int. Cl.$^3$ ............................................. C08G 63/70
[52] U.S. Cl. .................................... 528/480; 525/437; 525/438; 525/440; 526/344.3; 528/274; 528/288; 528/297; 528/486; 528/492; 528/493; 560/2
[58] Field of Search .............. 528/274, 288, 297, 480, 528/486, 492, 493; 525/437, 438, 440; 526/344.3; 560/2

[56] References Cited

U.S. PATENT DOCUMENTS

| | | | |
|---|---|---|---|
| 2,970,970 | 2/1961 | Prichard | 524/37 |
| 3,390,170 | 6/1968 | Sears | 560/2 |
| 3,954,716 | 5/1976 | Müller et al. | 525/437 |
| 4,016,142 | 4/1977 | Alexander et al. | 525/437 |
| 4,264,751 | 4/1981 | Scheibelhoffer | 525/437 |
| 4,316,832 | 2/1982 | Walkden | 524/775 |

FOREIGN PATENT DOCUMENTS 1533650 11/1978 United Kingdom .

OTHER PUBLICATIONS

Chem. Abstr., vol. 70, 96174d (1969).
Chem. Abstr., vol. 69, 36764r (1968).
Chem. Abstr., vol. 77, 6358j (1972).

*Primary Examiner*—Maurice J. Welsh
*Attorney, Agent, or Firm*—Mueller and Smith

[57] ABSTRACT

Disclosed is a method for reducing the odor and/or improving the performance of polyester plasticizers of the type made from a dibasic acid, a polyol, and a chain terminator wherein a molar excess of alcohol ingredients is used. Such improved polyester plasticizer is made by subjecting the polyester plasticizer to a second stage reaction with a treating agent reactive with hydroxyl groups to reduce the hydroxyl value to no more than about 4. Preferably, the low acid number of the initial polyester plasticizer is maintained. The treating agent can be monofunctional or poly-functional, though preferably a difunctional isocyanate is used. Conventional thermoplastic substrates, typified by polyvinyl chloride, can be plasticized with the novel polyester plasticizers of the present invention.

19 Claims, No Drawings

POLYESTER PLASTICIZER

CROSS-REFERENCE TO RELATED APPLICATIONS

This application is a continuation-in-part of application U.S. Ser. No. 526,598, filed Aug. 26, 1983, now abandoned.

BACKGROUND OF THE INVENTION

The present invention relates to polyester plasticizers for polyvinyl chloride resin (PVC) and the like, and more particularly to a method for improving the odor thereof while maintaining or improving requisite performance properties.

Many polymers tend to crystallize due to the regularity and symmetry of the polymer backbone. One method for reducing this crystallinity is by careful selection of the monomer units or by utilizing plasticizing comonomers. Such methods are known as internal plasticization. An alternative method for modifying the glass transition temperature ($T_g$) of the polymer is to add a low molecular weight compound as a plasticizer for the polymer. This method of plasticization is referred to usually as external plastization since the plasticizer is not chemically combined with the polymer. Performance properties of external plasticizers are known in the art and will be set forth in the examples. Depending upon the ultimate use of the polymer, the odor of the plasticizer may or may not be important. For example, polymeric refrigerator gaskets must not transfer odor to food and, thus, such low odor requirement is placed upon the plasticizer. Other intended uses of the polymer may have such low odor requirement also.

Heretofore, East German Patent No. 62,047 has proposed to improve the odor and color of a polyester plasticizer by an alkaline hydrogen peroxide treatment. German Offenlegunschrift No. 2042402 proposes to treat the polyester plasticizer with vacuum distillation, steam deodorization, and a bicarbonate/activated carbon filtration sequence in order to improve the odor. U.S. Pat. No. 3,390,170 has proposed to treat the ester plasticizers with bisphenol A polycarbonate in order to improve their odor. Sully et al., *J. Appl. Chem.* (London), 16(11), 333–335 (1966) has proposed a GLC technique to measure volatile odors in plasticizers and thereby remove such volatile odors through the column.

While such techniques have met with some success, the present invention provides an improved method for reducing the odor of such polyester plasticizers while maintaining, and often improving, the outstanding properties desired.

BROAD STATEMENT OF THE INVENTION

The present invention is directed to a method for improving a low acid number polyester plasticizer of the type made from a dibasic acid, a polyol, and a chain terminator wherein a molar excess of alcohol ingredients is used. Such improvement comprises subjecting the polyester to a second stage reaction with a treating agent reactive with hydroxyl groups to reduce the hydroxyl value to no more than about 4. The low acid number, desirably less than 10 and advantageously less than about 3-5, is maintained by such second stage reaction due to the selectivity of the treating agent.

Advantages of the present invention include the maintenance of the acid number specification of the polyester plasticizer while enhancing the low odor thereof. Another advantage is the maintenance of viscosity and other properties of the polyester plasticizer. A further advantage is the ability to synthesize the initial polyester plasticizer to have substantially reduced molecular weight followed by the use of a difunctional treating agent for reducing the odor of the plasticizer while building molecular weight (viscosity) to a desired level. A further advantage is the improvement in performance properties exhibited by the modified plasticizers. These and other advantages will be readily apparent to those skilled in the art based upon the disclosure contained herein.

DETAILED DESCRIPTION OF THE INVENTION

The objectionable odor of the polyester plasticizers has been determined to result largely from terminal hydroxyl groups residual in the polyester polymerization reaction. Moreover, a preponderance of such hydroxyl content apparently arises from low molecular weight hydroxyl compounds which are formed during the conventional polyesterification reaction. Such low molecular weight hydroxyl compounds are more volatile and mobile, thus, enhancing the objectionable odor which they impart. The treating agents of the present invention primarily selectively react with such lower molecular weight hydroxyl odor compounds and neutralize or rid such lower molecular weight compounds of their hydroxyl groups. An inherent advantage of this is that such lower molecular weight bodies are converted to higher molecular weight oligomers for reduced volatility and mobility thereof. Thus, improvement in odor may result from two consequences of the invention: the reduction of hydroxyl number of the polyester plasticizer and the molecular weight increase of the low molecular weight hydroxyl compounds contained therein. This results in a plasticizer having a narrower molecular weight distribution range without substantial increase in viscosity thereof.

Unexpectedly, along with the improvement in odor which results from the modification of the polyester plasticizers, it was determined that their performance properties also were not only maintained, but also improved in many instances. Performance properties which are improved notably include soap resistance and humidity spew. Other properties generally are substantially maintained and can be improved depending upon the particular plasticizer and treating agent. In this regard, it should be noted that the odor still is improved by virtue of the addition of the treating agent, though on occasion treating agent by-product from the reaction may impart a new odor to the product. Such new odor, however, can be removed by stripping or other technique at the expense of increasing the production costs of the product.

The treating agents useful in the present invention can be monofunctional, difunctional, or polyfunctional, though mono- and difunctional treating agents distinctly are preferred. The treating agent should not result in the production of a carboxyl group since the acid number of the polyester plasticizer should be maintained low for obvious performance reasons. Also, the treating agent must be fairly reactive under mild conditions so that the polyester plasticizer is not undesirably degraded for loss of color or the like due to the treating agent reaction. Further, the treating agent should not provide an objectionable odor itself or result in the production of an odor body due to its reaction, unless such resulting odiferous compound can be very readily removed, inactivated, or otherwise rendered nonodiferous. Preferred treating agents include, for example, anhydrides, isocyanates, ketene, epoxides, and the like. Such treating agents are rather reactive with hydroxyl functionality as required. The use of anhydrides, for example acetic anhydride, results in the formation of acetic acid which is much more readily removed from the modified polyester plasticizer than are the indigenous lower molecular weight hydroxyl odor bodies.

One class of such treating agents comprise monofunctional treating agents which can be used to advantageously modify a polyester plasticizer which has been synthesized to substantially its final form. The use of monofunctional treating agents under such circumstances provides some increase in molecular weight, though such increase typically is minor. Such treating agents do provide a narrower molecular weight distribution, however, by preferentially reacting with the lower molecular weight hydroxyl odor bodies indigenous to the polyester plasticizer. Representative such monofunctional treating agents include, for example, anhydrides such as acetic anhydride and propionic anhydride; isocyanates such as N-butyl isocyanate and phenyl isocyanate; and epoxides such as ethylene oxide, propylene oxide, and butylene oxide. The proportion of monofunctional treating agent utilized is adequate to reduce the hydroxyl value of the polyester plasticizer to no more than about 4 and desirably between about 1.5 and 4. At such low hydroxyl numbers, acceptable odor of the polyester plasticizer results.

Another embodiment of the treating agent is the use of difunctional treating agents wherein the polyester plasticizer is synthesized from ingredients to provide a much lower viscosity to the intermediate polyester product. This is necessary since the difunctional treating agent will link oligomeric chains together to substantially increase the ultimate viscosity, eg. molecular weight, of the polyester plasticizer to the desirable ultimate specifications. Such difunctional treating agents can result in a much lower cost polyester plasticizer by varying the initial ingredients required to synthesize the lower viscosity intermediate. Performance of the plasticizer, however, can be maintained, and often improved, through such technique. Representative of such difunctional treating agents include, for example, diisocyanates such as toluene diisocyanate, isophorone diisocyanate, diphenyl methane diisocyanate, hexamethylene diisocyanate, dicyclohexyl methane diisocyanate, carbodiimide blocked diphenyl methane diisocyanate, and the like and even mixtures thereof.

The polyester plasticizer is synthesized in conventional fashion by reacting a dibasic acid, a polyol, and a chain terminator under conventional polyesterification conditions in the presence of an ester-promoting catalyst. Suitable dicarboxylic acids preferably are devoid of branching and typically contain from about 4 to 12 carbon atoms, such as, for example, glutaric acid, adipic acid, pimelic acid, suberic acid, azelaic acid, sebacic acid, dodecanedioic acid, isophthalic acid, orthophthalic acid, terephthalic acid, and the like and mixtures thereof. Polyols preferably are glycols, though triols or the like find use on occasion. Typical glycols also are linear and have from about 2 to 10 carbon atoms, for example. Such glycols include ethylene glycol, 1,2-propylene glycol, 1,3-propane diol, 1,4-butane diol, 1,3-butane diol, 1,6-hexane diol, 1,10-decane diol, diethylene glycol, triethylene glycol, and the like and mixtures thereof. The chain terminator of choice is a monoalcohol or a monoacid. Suitable chain terminating alcohols include, for example, $C_1$–$C_{10}$ or higher alcohols including, methanol, butanol, hexanol, 2-ethylhexyl alcohol, isodecyl alcohol, and the like and even mixtures thereof. Suitable chain terminating acids include, for example, $C_6$–$C_{18}$ monocarboxylic acids and especially fatty acids derived from natural sources, eg. coconut oil fatty acids and tallow fatty acids.

Generally, the temperature of esterification is maintained in the range of about 150°–230° C. and an esterification catalyst is used. Such catalysts are conventional and include, for example, titanium tetrachloride, zinc acetate, zinc oxide, stannous oxylate, dibutyl tin oxide and the like. Conventional color stabilizers, eg. tri-lauryl phosphite or the like, also can be included in the reaction mixture. The esterification ingredients are reacted for a time adequate to produce a polyester plasticizer or polyester plasticizer intermediate having an acid number of less than 10, advantageously less than 3, and preferably less than about 1.5. Desirably, the polyester will have a molecular weight ranging from about 500 to 8,000 (molecular number average). Such polyester plasticizer, while having desirable plasticizing properties, suffers from an odor which is unacceptable for sensitive utilities, eg. where food or the like is involved. Accordingly, the synthesized polyester is subjected to a secondary or second stage reaction with the treating agent as defined above.

The proportion of treating agent as noted above is adequate to reduce the hydroxyl value of the ultimate polyester plasticizer to no more than about 4 and desirably between about 1.5 and 4. Depending upon the treating agent of choice, reaction conditions will follow accordingly. The resulting stabilized polyester plasticizer maintains or improves advantageous properties while providing a low odor product.

The low odor polyester plasticizer of the present invention is primarily intended for use in polyvinyl chloride resin, though it finds utility in a wide variety of synthetic resin compositions. Additional compositions include, for example, poly(acrylonitrile) butadiene styrene (ABS), polyvinyl acetate, epichlorohydrin, and the like. Incorporation of the plasticizer into the PVC or like resin is accomplished in conventional fashion and need not be detailed here. The outstanding performance which the low odor modified polyester provides as a plasticizer is adequately demonstrated in the examples which follow. In this application, all percentages and proportions are by weight, and all units are in the metric system, unless otherwise expressly indicated.

IN THE EXAMPLES

In the following examples, the polyesters which were synthesized under conventional polyesterification conditions typically were reacted at a temperature of about 225° C. with water of reaction being removed as a toluene azeotrope at a temperature of about 85° C. The esterification catalyst of choice was dibutyl tin oxide and tri-lauryl phosphite was used as a color stabilizer. The catalyst and stabilizer are not set forth in the Examples but their use is conventional. Isocyanate addition in the Examples typically was accomplished at a temperature of about 90° C. under a nitrogen blanket. This reaction was determined to be complete when IR analysis showed the absence of the NCO peak.

The plasticizer tests reported in the Example were conducted in accordance with the standard test procedure of the Plasticizer Research Group, Sherex Chemical Company, Inc., Mar. 20, 1973. While these test procedures are typical of those utilized in the industry, further details of each test will be set forth below.

CLASH AND BERG LOW TEMPERATURE FLEXIBILITY

This test was performed in accordance with ASTM D1043-72. Test results are reported in degrees Centigrade.

ELONGATION

This test was performed in accordance with ASTM 412-75. The results are reported in percent extension or elongation at the breaking point.

HARDNESS, DURO $A_2$

A vinyl blank measuring $5.08 \times 5.08 \times 1.27$ cm was aged for 24 hours. Using a Shore $A_2$ Durometer, the point of the Durometer was placed in contact with the vinyl surface and held in place for 10 seconds. Both the instantaneous and the 10 second delay readings were recorded. A minimum of six readings at different sample locations were recorded. These readings were averaged for the reported values of the instantaneous and 10 second delay. Results are recorded in conventional Shore Hardness scale.

HEXANE EXTRACTION

Four film samples, $2.54 \times 5.08 \times 0.5$ cm were weighed to the nearest one-tenth of a milligram. Each sample was suspended in individual 0.24 liter (8 ounce) jar of hexane for one hour at room temperature (about 23° C.). The samples were removed, dried and post conditioned for one hour at about 107° C. The samples then were aged for an additional one hour at room temperature and weighed to the nearest one-tenth of a milligram. The percent weight loss then was computed and recorded.

MINERAL OIL EXTRACTION

Four film samples, $2.54 \times 5.08 \times 0.05$ cm, were weighed on analytical balance to the nearest one-tenth of a milligram. Each sample then was immersed in individual 0.24 liter (8 ounce) jars of light grade mineral oil for 24 hours at about 49° C. Samples were removed from the jar, excess oil removed and thoroughly rinsed and dried. The samples were conditioned for one hour at room temperature followed by their weighing to the nearest one-tenth of a milligram. The percentage weight loss then was calculated and reported.

100% MODULUS TEST

This test was performed in accordance with ASTM 412-75. The results are reported in kilograms per square centimeter.

OVEN VOLATILITY

Four film samples, $5.08 \times 5.08 \times 0.05$ cm, were weighed to the nearest one-tenth of a milligram on an analytical balance. The samples were suspended individually in hot air circulating oven held at about 107° C. for 16 hours. The samples then were post conditioned at room temperature for one hour and weighed to the nearest one-tenth of a milligram. The percent weight loss then was computed and is reported.

RUBBER MIGRATION

Eight square samples of the appropriate rubber (3.81 cm square samples measuring 0.1905 cm thick) have a sample of the plasticized vinyl ($2.54 \times 2.54 \times 0.05$ cm) between the two rubber samples and 2 psi exerted on each sandwich. These sandwich samples are placed in a hot air circulating oven for 24 hours held at 100° C. The samples then are removed from the sandwich and post conditioned for one hour at room temperature. Each sample is weighed to the nearest one-tenth of a milligram and the percent weight change is recorded.

1% SOAP EXTRACTION

Four samples, $2.54 \times 5.08 \times 0.05$ cm, were weighed on an analytical balance to the nearest one-tenth of a milligram. A 1 weight percent solution of Ivory Snow soap was prepared by heating water foe one-half hour at a temperature of about 98° C. The test samples were immersed in the soap solution using 0.24 liter (8 ounce) jar per sample. The soap solution was maintained at about 98° C. for 24 hours in a hot air circulating oven. The samples were removed from the jars, thoroughly rinsed with clean water and blotted dry with paper hand towels. Post conditioning of the samples was conducted at a temperature of about 107° C. for one hour after which the samples were weighed to the nearest one-tenth of a milligram. The percent weight loss then was calculated and reported.

HUMIDITY SPEW

Film samples measuring $2.54 \times 5.08 \times 0.05$ cm were cut from the vinyl stock. 0.24 Liter (8 ounce) jars were filled with 50 ml each of the distilled water. The samples were attached to hooks on the jar lids and the lids placed on each jar. The jars then were placed in an oven held at a temperature of 70° C. The water level was periodically checked and replaced as necessary. The results of the compatibility of the samples with the humidity was recorded in days.

STYRENE FLEXURAL (CRAZE) TEST

Samples measuring $1.905 \times 13.335$ cm were cut parallel to the extrusion direction from 0.2286–0.254 cm thick high impact polystyrene extruded sheet (Ball Plastics, Evansville, Ind.). Each sample was measured with a micrometer at its center for width and thickness dimensions. This sample was wrapped with the rear side in tension over the brass jig of radius 17.78 cm, and taped to the jig at the ends. This assembly was placed against the tail of the test gasket and forced against it by applying 20 inch-pounds (2.26 joules) torque to a 5/16 inch (0.79 cm) by no. 24 bolt against the top of the jig.

The assembly then immediately was placed in a chamber held at a temperature of about 32° C. and stored for 24 hours. After immediate disassembly, the styrene part was conditioned at room temperature for at least 15 minutes and then tested for its flexural strength in accordance with ASTM D-790-71 using a 2.54 cm span and cross head motion of 0.127 cm per minute. The flexural strength of the tested sample as a percentage of the original sample then was calculated and recorded.

TENSILE STRENGTH

This test was performed in accordance with ASTM 412-75. The results are reported in kilograms per square centimeter.

EXAMPLE 1

A polyester plasticizer was prepared under conventional polyesterification conditions from the following ingredients:

| POLYESTER 44-49 | |
|---|---|
| Ingredient | Amount (weight equivalents) |
| Adipic acid | 70.4 |
| 1,3-Butylene glycol | 68.2 |
| Iso-decyl alcohol | 5.0 |

Viscosity (stokes) = 51.6
Acid Number (AN) = 1.0
Hyroxyl No. (OH) = 17.6

Several different screening procedures were subjectively evaluated for odor improvement capability. Lots of Polyester 44-49 were combined with 10 wt-% of the following solvents at room temperature followed by heating to 180° C. while pulling a vacuum on the lots. Full vacuum was reached and the lots held at 200° C. for ½ hour. The solvent-treated lots were compared to a conventional deodorized (thin-film stripped) Polyester 44-49 sample by subjective smelling by laboratory personnel.

| Solvent | |
|---|---|
| 1. | Xylene |
| 2. | Acetic acid |
| 3. | Water/acetone (equal weight mixture) |
| 4. | Isopropanol |
| 5. | Acetic anhydride |
| 6. | #5 rewashed and stripped with xylene (10 wt %) |
| 7. | Napthalene |
| 8. | 50% $H_2O_2$ (0.25 wt %, heated to 100° C. and vacuum stripped) |

Solvent treatment 6 proved to be the least odorous sample, followed by #5, and then the conventionally stripped comparison. All other samples were not significantly improved after treatment compared to the untreated polyester.

Based on the foregoing results, three different acetic anhydride treatment levels were tried: #1, 5 wt-%; #2, 2.5 wt-%; and #3, 1 wt-%. The same treatment conditions prevailed. The conventional polyester odor was replaced by a noticeable acetic acid odor which was more noticeable for sample #1 and least noticeable for sample #3. Washing with 10 wt-% xylene followed by vacuum stripping significantly reduced the odor of samples #1 and #2.

These results suggest that hydroxyl-functional odor bodies in the polyester can be inactivated by chemical reaction. In this instance, removal of by-product acetic acid provided substantial odor improvement of the polyester plasticizer.

EXAMPLE 2

In this example, several different polyesters were synthesized and heated with toluene diisocyanate (TDI). The treated samples were evaluated for odor.

| Ingredient | POLYESTER (wt. eq.) | | | | | |
|---|---|---|---|---|---|---|
| | 44-80 | 44-8202 | 44-78 | 44-8201 | 44-68 | 44-73 |
| Adipic Acid | 9.68 | 9.68 | 9.68 | 9.68 | 9.68 | 9.68 |
| 1,3-Butane diol | 9.18 | 9.18 | 8.99 | 8.99 | — | — |
| 1,4-Butane diol | — | — | — | — | 4.10 | 4.10 |
| 1,2-Propylene glycol | — | — | — | — | 4.89 | 4.89 |
| Isodecanol | 0.87 | 0.87 | 1.06 | 1.06 | 1.06 | 1.06 |
| TDI | — | 2.5% | — | 2.9% | — | 1.7% |
| A.N. | 0.90 | 0.77 | 0.54 | 0.52 | 1.32 | 1.31 |
| Visc. (Stokes) | 33.7 | 115.6 | 23.1 | 59.6 | 25.2 | 46.8 |
| O.H. | 18.1 | — | 15.84 | — | 10.79 | 4.61 |

All of the diisocyanate-modified polyesters possessed a much improved odor compared to their corresponding un-modified forms.

EXAMPLE 3

The following polyester plasticizer was synthesized.

| Polyester 44-99 | |
|---|---|
| Ingredient | Wt. Eq. |
| Adipic acid | 71.7 |
| 1,2-Propylene glycol | 36.2 |
| 1,4-Butane diol | 30.4 |
| 2-Ethyl hexyl alcohol | 7.8 |
| A.N. | 0.85 |
| OH | 12.6 |
| Visc. (Stokes) | 22.8 |

The polyester (7472.25 g) was reacted with TDI (150.78 g) to produce a modified polyester having an A.N. of 0.88, OH of 2.3, and a viscosity of 50.6 Stokes. PVC resin formulations then were compounded.

| Formulation (PHR): | |
|---|---|
| P.V.C. Resin | 100 |
| Plasticizer Polyester | 50 |
| Ferro 5002* | 2.5 |

| | Results: | |
|---|---|---|
| Test | 44-49 (Control) | 44-99 |
| Tensile Strength, P.S.I. | 2885 | 2800 |
| Elongation, % | 365 | 290 |
| 100% Modulus, P.S.I. | 1875 | 1780 |
| Hardness, Duro $A_2$ | | |
| Instant | 91 | 90 |
| 10 Sec. | 87 | 85 |
| Hexane Ext., % Loss | 0.39 | 0.29 |
| Mineral Oil Ext., % Loss | 0.40 | 0.59 |
| 1% Soap Ext., % Loss | 3.65 | 3.81 |
| Oven Volatility, % Loss | 0.48 | 0.44 |
| Clash & Berg, °C. | −6.2 | −7.0 |
| Humidity Spew, days | 33 | 49 |

*Ferro 5002 is a proprietary Ba, Cd organic inhibitor, Ferro Corporation, Bedford, Ohio.

The above-tabulated data shows that the polyester plasticizer performance is maintained by the modified, low odor polyesters.

EXAMPLE 4

The procedure of Example 3 was repeated as follow:

| Polyester 44-143 | |
|---|---|
| Ingredient | Wt. Eq. |
| Adipic acid | 71.7 |
| 1,2-Propylene glycol | 36.2 |
| 1,4-Butane diol | 30.4 |

-continued

| Polyester 44-143 | |
|---|---|
| Ingredient | Wt. Eq. |
| 2-Ethyl hexyl alcohol | 7.85 |
| A.N. | 0.67 |
| OH | 11.02 |
| Visc. (Stokes) | 25.0 |

Polyester 44-143 (7440 g) was reacted with TDI (135 g) to produce a modified polyester having an A.N. of 0.64, an OH of 4.2, and a viscosity of 51.0 Stokes.

A refrigerator gasket formulation was compounded.

|  | 44-49 (Control) | 44-143 |
|---|---|---|
| Formulation (P.H.R.): | | |
| Geon 92[1] | 100 | 100 |
| CaCO$_3$ | 35 | 35 |
| Ferro 1820[2] | 2 | 2 |
| Ferro 7-V-2[3] | 1 | 1 |
| Steric Acid | 0.25 | 0.25 |
| Plasticizer | 95 | 95 |
| Results: | | |
| Test | | |
| Tensile Strength, psi | 1471 | 1447 |
| Elongation, % | 307 | 313 |
| 100% Modulus, kg/cm$^2$ | 47.45 | 45.13 |
| Hardness, Duro A2 | | |
| Instant | 72 | 68 |
| 10 Sec. | 59 | 57 |

[1]Geon 92 is a PVC homopolymer, B. F. Goodrich Company, Cleveland, Ohio.
[2]Ferro 1820 is a proprietary Ba, Cd organic inhibitor, Ferro Corp., Bedford, Ohio.
[3]Ferro 7-V-2 is a proprietary liquid epoxy inhibitor, Ferro Corp., Bedford, Ohio.

Again, the excellent performance of the modified polyester plasticizer is confirmed.

EXAMPLE 5

The following polyester was synthesized and then reacted with different diisocyanates as follows:

| Ingredient | Polyester 44-100 (wt. eq.) |
|---|---|
| Adipic acid | 71.7 |
| 1,2-Propylene glycol | 36.2 |
| 1,4-Butane diol | 30.4 |
| 2-Ethyl hexyl alcohol | 7.8 |
| A.N. | 0.88 |
| OH | 15.6 |
| Visc. (Stokes) | 21.1 |
| Color | 30 APHA |

| | Modified Polyester (wt % diisocyanate) | | |
|---|---|---|---|
| Diisocyanate* | 44-100 | 44-103 | 44-104 |
| TDI | 1.99 | — | — |
| IPDI | — | 1.99 | — |
| MDI | — | — | 1.99 |
| AN | 0.88 | 0.88 | 0.88 |
| OH | 5.53 | 6.15 | 9.40 |
| Visc. (Stokes) | 45.8 | 35.9 | — |

*TDI eq. wt. of 87.1, isophorone diisocyanate eq. wt. of 111.1 and MDI eq. wt. of 125.

The odor of each modified polyester was unacceptable because the final hydroxyl value was too high. A final hydroxyl number of less than about 4 has been determined to be required in order for the odor to be acceptable. Nevertheless, performance of the modified polyesters still is quite acceptable as the following results demonstrate.

| Formulation (PHR): | |
|---|---|
| Geon 102 EP[1] | 100 |
| Ferro 6-V-6A[2] | 2.5 |
| Plasticizer Polyester | 50 |

| | Result: | | | |
|---|---|---|---|---|
| Test | Control | 44-100 | 44-103 | 44-104 |
| Hexane extraction (% wt loss) | 0.35 | 0.41 | 0.42 | 0.42 |
| Mineral oil extraction (% wt loss) | 0.51 | 0.67 | 0.71 | 0.75 |
| Oven volatility (% wt loss) | 0.58 | 0.92 | 0.87 | 0.94 |
| Clash & Berg (°C.) | −6.3 | −4.8 | −5.8 | −6.7 |
| Humidity Spew (days) | 33 | 30 | 30 | 29 |

[1]Geon 102 EP is a PVC homopolymer (100% passes through 42 mesh), B. F. Goodrich Company, Cleveland, Ohio
[2]Ferro 6-V-6A is a proprietary liquid. Ba, Cd, Zn organic inhibitor, Ferro Corp., Bedford, Ohio.

EXAMPLE 6

In this example, the three different diisocyanates evaluated in Example 5 were reacted in a greater amount sufficient to lower the hydroxyl number to 4 or less and, thus, provide a low odor product.

| Ingredient | Polyester 107 (wt. eq.) |
|---|---|
| Adipic acid | 71.7 |
| 1,2-Propylene glycol | 36.2 |
| 1,4-Butane diol | 30.4 |
| 2-Ethylhexanol | 7.8 |
| AN | 0.60 |
| OH | 11.8 |
| Visc. (Stokes) | 24.7 |

| | Modified Polyester (wt % Diisocyanate) | | |
|---|---|---|---|
| Diisocyanate | 44-111-1 | 44-111-2 | 44-11-3 |
| TDI | 1.83 | — | — |
| IPDI | — | 2.33 | — |
| MDI | — | — | 2.63 |
| A.N. | 0.60 | 0.60 | 0.60 |
| OH | 2.64 | 2.73 | 4.0 |
| Visc. (Stokes) | 50.2 | 46.6 | 55.9 |

Each of these modified polyesters possessed very little odor because their OH values were reduced to be less than about 4. Performance data on these polyesters is given below:

| Formulation (PHR): | |
|---|---|
| Geon 102 EP | 100 |
| Ferro 5002 | 2.5 |
| Plasticizer | 50 |

| | Results: | | | |
|---|---|---|---|---|
| Test | Control | 44-111-1 | 44-111-2 | 44-111-3 |
| Hextane Ext., % Loss | 0.35 | 0.30 | 0.32 | 0.28 |
| Mineral Oil Ext., % Loss | 0.54 | 0.54 | 0.57 | 0.58 |
| Oven Volatility, % Loss | 0.53 | 0.67 | 0.54 | 0.54 |
| 1% Soap H$_2$O Extraction (% wt loss) | 2.74 | 1.96 | 2.05 | 1.83 |
| Clash & Berg (°C.) | −5.9 | −6.3 | −6.8 | −6.9 |
| Humidity Spew (Days) | 51 | 56 | 56 | 47 |

These results show that the properly modified polyesters possess improved performance characteristics compared to their unmodified form and their undermodified form (see Example 5).

EXAMPLE 7

Another bath of Polyester 44-99 (Example 3) was formulated to an A.N. of 0.46, an OH of 14.8, and a viscosity of 23.1 Stokes. This Polyester, 44-147, then was modified with the following diisocyanates.

| GENERAL DIISOCYANATE PROPERTIES* | | | | | | |
|---|---|---|---|---|---|---|
| | TDI | IPDI | MDI | HMDI | $H_{12}$MDI | 143L |
| Molecular Weight | 174 | 222 | 250 | 168 | 262 | 287 |
| Appearance at 25° C. | liquid | liquid | fused solid | liquid | liquid | liquid |
| Melting Point (°C.) | 12.78 | −60 | 37.22 | −55 | 18.89 | −58.33 |
| Boiling Point (°C.) | 251.11 | 157.78 at 10 mm | 200 at 5 mm | 212.78 | decompose | 200 at 5 mm |
| Vapor Density (air = 1) | 6.00 | 7.67 | 8.50 | — | — | — |
| Vapor Presssure (mm Hg at 25° C.) | 0.025 | .0003 | .0003 | 0.05 | 0.001 | .0003 |
| Flash Point (PMCC) | 126.67° C. | — | 190.56° C. | — | — | 176.67° C. |
| Flash Point (COC) | — | 162.78° C. | 201.67° C. | 140° C. | — | — |
| Flash Point (TCC) | — | — | — | — | 201.67° C. | — |
| TLV (PPM) | 0.02 | — | 0.02 | 0.02 | 0.01 | 0.02 |

TDI — Toluene Diisocyanate
IPDI — Isophorone Diisocyanate
MDI — Diphenyl Methane Diisocyanate
HMDI — Hexamethylene Diisocyanate
$H_{12}$MDI — Dicyclohexylmethane Diisocyanate
143L — Carbodiimide Blocked MDI The following performance data was recorded:

| | 44-99 | 44-178 | 44-175 | 44-177 | 44-165 | 44-179 | 100-16 |
|---|---|---|---|---|---|---|---|
| | | Plasticizer Properties | | | | | |
| Diisocyanate | TDI | TDI | IPDI | MDI | $H_{12}$MDI | 143L | HMDI |
| Acid Value | 0.46 | 0.45 | 0.45 | 0.45 | 0.45 | 0.45 | 0.45 |
| Hydroxyl Value | 4.2 | 4.6 | 2.6 | 4.3 | 3.2 | 4.6 | — |
| Viscosity, Stokes | 51 | 55 | 54 | 67 | 59 | 68 | 48 |
| Color, APHA | 50 | 70 | 70 | 100 | 60 | 180 | 50 |
| % Diisocyanate | 1.78 | 2.25 | 2.85 | 3.19 | 3.34 | 3.46 | 2.17 |
| Product Odor | Exc. | Good | Exc. | Exc. | Exc. | Poor | Exc. |
| Formulation (PHR): | | | | | | | |
| Geon 92 | | 100 | | | | | |
| Atomite | | 35 | | | | | |
| Ferro 1820 | | 2 | | | | | |
| Ferro 7-V-2 | | 1 | | | | | |
| TiO$_2$ | | 5 | | | | | |
| Steric Acid | | 0.25 | | | | | |
| Plasticizer Polyester | | 95 | | | | | |
| | Plasticizer Performance-Gasket Formula | | | | | | |
| Hexane Ext., % Loss | 0.63 | 0.58 | 0.65 | 0.56 | 0.63 | 0.57 | .61 |
| Min. Oil Ext. % Loss | 1.70 | 1.70 | 1.75 | 1.74 | 1.57 | 1.51 | 1.69 |
| 1% Soap Ext. % Loss | 2.94 | 2.50 | 2.90 | 2.23 | 2.40 | 1.88 | — |
| Oven Vol., % Loss | 0.77 | 0.80 | 0.80 | 0.76 | 0.74 | 0.74 | .82 |
| Clash & Berg, °C. | −25.0 | −23.7 | −22.8 | −23.4 | −23.1 | −22.6 | — |
| Humidity Spew, Days | 37 | 30 | 30 | 28 | 46 | 30 | — |
| Styrene Craze: % Retention | 72.6 | 69.2 | 69.3 | 78.0 | 70.1 | 75.3 | — |

The above-tabulated data shows that the modified polyesters all perform better than the standard unmodified form. Choice of diisocyanate, then, can be predicated upon cost, toxicity, availability, and/or other considerations.

EXAMPLE 8

Polyester 107 of Example 6 (529.8 g) was modified with N-butyl isocyanate (11.04 g) to produce a modified polyester (44-120) having an AN of 0.6, OH value of 2.4, and a viscosity of 26 stokes. Polyester 147 of Example 7 was modified with acetic anhydride to produce a modified polyester 96-603 having an AN of 0.68, OH value of 1.5, and a viscosity of 21.4 stokes. The two modified polyesters and unmodified Polyester 44-147 were evaluated as follows:

Formulation (PHR):

| | |
|---|---|
| Geon 102 EP | 100 |
| Ferro 5002 | 2.5 |
| Plasticizing Polyester | 50 |

| | Results: | | |
|---|---|---|---|
| Test | 44-147 (Control) | 44-120 | 44-147 Acetylated |
| Hexane Ext., % Loss | 0.35 | 0.39 | 0.37 |
| Mineral Oil Ext., % Loss | 0.788 | 0.79 | 0.83 |
| Oven Volatility, % Loss | 0.64 | 0.65 | 0.61 |
| Humidity Spew, days | 42 | 65 | 42 |

These results again demonstrate the performance retention which the inventive modified polyesters possess. Importantly, such modified polyesters also possess a very low odor.

EXAMPLE 9

The following polyesters were formulated and then reacted with MDI.

| | Polyester (wt. eq.) | | |
|---|---|---|---|
| Ingredient | 100-30 | 100-45 | 100-46 |
| Adipic acid | 71.7 | 9.68 | 9.68 |
| 1,2-Propylene glycol | 36.2 | 4.84 | 4.89 |
| 1,4-Butane diol | 30.4 | 4.05 | 4.10 |
| 2-Ethyl hexanol | 7.85 | 1.16 | 1.16 |
| A.N. | 0.46 | 1.12 | 1.19 |
| OH | 14.8 | 15.44 | 18.49 |
| Visc. (Stokes) | 23.1 | 18.3 | 17.0 |
| MDI Polyester | | | |
| A.N. | 0.45 | 1.1 | 1.13 |
| OH | 1.7 | 2.8 | 4.84 |
| Visc. (Stokes) | 64.9 | 50.7 | 56.8 |
| Odor | Exc. | Exc. | Very Good |

| Formulation (PHR): | |
|---|---|
| Geon 102 EP | 100 |
| Ferro 5002 | 2.5 |
| Plasticizer Polyester | 50 |

| | Results: | | |
|---|---|---|---|
| Test | 100-30 | 100-45 | 100-46 |
| Hexane Ext., % Loss | 0.32 | 0.34 | 0.32 |
| Mineral Oil Ext., % Loss | 0.49 | 0.58 | 0.54 |
| Oven Volatility, % Loss | 0.61 | 0.71 | 0.68 |
| 1% Soap Ext., % Loss | 1.93 | 2.52 | 2.49 |
| Humidity Spew, days | 42 | 42 | 35 |

Again, excellent odor is coupled with excellent performance for the inventive polyesters.

EXAMPLE 10

Pilot plant batches (Nos. 2300R and 2307R) of polyester 100-30 (Example 9) were synthesized along with another laboratory batch (No. 100-61) as follows:

| | Polyester (Weight Parts) | |
|---|---|---|
| Ingredient | 2300R and 2307R | 100-61 |
| Adipic Acid | 673 | 5256.9 |
| 1,2-Propylene glycol | 178 | 1388.4 |
| 1,4-Butane diol | 177 | 1381.0 |
| 2-Ethyl hexanol | 138 | 1073.7 |
| AN | 0.5 | 0.97 |
| OH | 14.0 | 18 |
| Visc.(Stokes) | 20.6 | 18.5 |
| MDI | 30 | 4.13 wt % |
| AN | 0.50 | 0.97 |
| OH | 1.07 | 2.48 |
| Visc. (Stokes) | 54.5 | 64.7 |
| Color | 100 APHA | 60 APHA |

The formulations compounded and test results recorded are set forth below:

| Formulation (PHR): | |
|---|---|
| Geon 102 EP | 100 |
| Ferro 5002 | 2.5 |
| Plasticizer Polyester | 50 |

| Results: | 44-99 | 2300R | 23007R | 100-61 |
|---|---|---|---|---|
| Tensile Strength, kg/cm² | — | 214.91 | 228.55 | 224.61 |
| Elongation, % | — | 310 | 307 | 297 |
| 100% Modulus | — | 2265 | 2411 | 2410 |
| Hardness, Duro A2 | | | | |
| Instant | 95 | 94 | 95 | 95 |
| 10 Sec. | 88 | 89 | 90 | 90 |
| Hexane extraction (% wt loss) | 0.26 | 0.25 | 0.24 | 0.26 |
| Mineral oil extraction (% wt loss) | 0.58 | 0.45 | 0.47 | 0.45 |
| 1% Soap H₂O extraction (% wt loss) | — | 1.88 | 2.32 | 2.27 |
| Oven Volatility, % Loss | 0.66 | 0.69 | 0.62 | 0.66 |
| Clash & Berg (°C.) | −6.6 | −4.5 | −4.0 | −4.3 |
| Humidity Spew (Days) | 49–50 | 49–50 | 35 | 44 |
| Rubber Migration, % wt change | | | | |
| Neoprene | — | −1.78 | −2.36 | −2.06 |
| Natural rubber | — | +1.24 | +1.08 | +1.18 |
| GRS | — | +1.41 | +1.18 | +1.44 |
| Kerosene Extraction (% wt loss) | — | 0.45 | 0.55 | 0.51 |

Next, the pilot plant batch polyesters were used to compound refrigerator gasket formulations and tested as follows:

| Formulation (PHR): | |
|---|---|
| Geon 92 | 100 |
| Epoxidized soybean oil | 5 |
| Atomite | 50 |
| Vanstay 5995 | 2.5 |
| TiO₂ | 3 |
| Vancide 89 | 0.2 |
| Plasticizer Polyester | 95 |

| | Results: | | |
|---|---|---|---|
| Test | 2300R | 2300R* | 2307R |
| Tensile Strength, kg/cm² | 119.02 | 119.37 | 122.04 |
| Elongation, % | 393 | 389 | 388 |
| 100% Modulus, kg/cm² | 55.1 | 55.26 | 54.27 |
| Deionized Water extraction (% wt loss) | 0.52 | 0.58 | 0.67 |
| Wesson oil (% wt loss) | 0.89 | 0.89 | 0.94 |
| 1% Soap Extraction (% wt loss) | 5.88 | 6.07 | 6.78 |

*Duplicate tests except for the absence of Vancide 89 in the formulation.

Again, the excellent performance of the low-odor polyester plasticizers is demonstrated.

EXAMPLE 11

The advantageous, low odor polyester of Example 10 was found to be incompatible with ABS subtrates. Use of different polyols in the polyester formulation was postulated to rectify such incompatibility. The following polyesters were synthesized.

| | Polyester (wt. et.) | |
|---|---|---|
| Ingredient | 100-26-1 | 100-170 |
| Adipic Acid | 4.46 | 40.41 |
| Neopentyl glycol | 3.77 | 51.84 |
| Iso-decyl alcohol | 0.98 | 11.63 |
| AN | 0.32 | 0.40 |
| OH | 23.6 | 16.85 |
| Visc. (Stokes) | 10.3 | 13.0 |

Polyester 100-26-1 was modified with MDI to a viscosity of 39.5 Stokes and then subjected to an ABS resistance test which comprised immersing a strip of ABS in a beaker containing the modified polyester. After sitting overnight at 70° C., the sample was removed from the beaker and its tackiness evaluated by touch. On a scale of 1 (no tack) to 5 (tacky and soft), the modified polyester rated 1.

Polyester 100-170 also was modified and fully evaluated for its suitability in PVC resin.

| Modification of Polyester 100-170 | |
| --- | --- |
| Diisocyanate | 100-183 |
| MDI | 3.75 wt % |
| AN | 0.40 |
| OH | 2.40 |
| Visc. (Stokes) | 37.5 |
| Odor | Very, very low |

Modified Polyester 100-183 was compounded into the formulation set forth in Example 6 with the following results being recorded.

| Results: | |
| --- | --- |
| Test | 100-183 |
| Hexane extraction (% wt loss) | 0.43 |
| Mineral oil extraction (% wt loss) | 0.63 |
| Oven Volatility, % Loss | 0.41 |
| 1% Soap H₂O Extraction (% wt loss) | 0.96 |
| Rubber Migration, % wt loss | |
| Neoprene | 4.11 |
| Natural Rubber | 2.20 |
| GRS | 1.56 |

Next, modified polyester 100-183 was compounded into the refrigerator gasket formulation of Example 10 and evaluated as follows:

| Results: | |
| --- | --- |
| Test | 100-183 |
| Hexane extraction (% wt loss) | 1.45 |
| Mineral oil extraction (% wt loss) | 2.75 |
| Oven Volatility, % Loss | 0.40 |
| Deionized water extracton (% wt loss) | 0.54 |
| Wesson oil (% wt loss) | 1.12 |
| 1% Soap H₂O extraction (% wt loss) | 6.58 |
| Styrene Flex retention, % | 81 |
| *ABS mar | None |

*A 2.54 cm square (1 square inch) sample of the plasticized PVC placed on the ABS material was placed under a 0.90 kg (2 lb.) weight for 7 days at a temperature of 70° C. (158° F.) and the extent of any mar on the polished surface of the ABS material evaluated.

The modified polyester of this example is seen to be compatible with ABS and with PVC subtrates.

EXAMPLE 12

The following polyesters were prepared for evaluation:

| Ingredient | 44-147 | SC4-170 | Polyester (wt eq.) 107 |
| --- | --- | --- | --- |
| Adipic Acid | 71.7 | 71.7 | 71.7 |
| 1,2-Propylene glycol | 36.2 | 36.2 | 36.2 |
| 1,4-Butane diol | 30.4 | 30.4 | 30.4 |
| 2-Ethylhexanol | 7.85 | 7.85 | 7.85 |
| AN | 0.46 | 1.0 | 0.60 |
| OH | 14.8 | 11.1 | 11.8 |
| Visc. (Stokes) | 23.1 | 11.3 | 24.7 |

Polyester 44-147 was a control Polyester. SC4-170 was treated with 15.4 grams of MDI to make modified polyester 135-48. Polyesters 44-120 and 44-147 Acetylated of Example 8 also were used in this example.

| | Modified Polyesters | | | |
| --- | --- | --- | --- | --- |
| | 44-147 (Control) | 135-48 | 44-147 Acetylated | 44-120 |
| Treating Agent | None | MDI | Acetic Anhydride | N—Butyl Isocyanate |
| AN | 0.46 | 1.0 | 0.68 | 0.6 |
| OH | 14.8 | 2.31 | 1.5 | 2.4 |
| Visc. (Stokes) | 23.1 | 22.0 | 21.4 | 26.0 |

Each modified polyester and the control were evaluated in the formulation of Example 8 with the following test results being recorded.

| Results: | | | | |
| --- | --- | --- | --- | --- |
| Test | | | | |
| Hexane Ext., % Loss | 0.35 | 0.34 | 0.37 | 0.39 |
| Mineral Oil Ext., % Loss | 0.78 | 0.87 | 0.83 | 0.79 |
| Oven Volatility, % Loss | 0.64 | 0.81 | 0.61 | 0.65 |
| 1% Soap H₂O Extraction (% wt loss) | 4.45 | 2.9 | 3.60 | 3.25 |
| Humidity Spew (Days) | 42 | 56 | 42 | 65 |

The above-tabulated results demonstrate the performance improvement which the modified polyesters display. Especially note the improvement in soap resistance and humidity spew. These results are important because of the similarity in composition of the unmodified polyesters and closeness of the viscosities of the modified polyesters and control. Truly equivalent plasticizers were compared. Of course, odor improvement also was noted.

EXAMPLE 13

The following polyesters were synthesized.

| | Polyester (Weight Parts) | | |
| --- | --- | --- | --- |
| Ingredient | 134-18 | 134-18-2 | 100-53 |
| Adipic Acid | 706.5 | 706.5 | 706.5 |
| 1,2-Propylene glycol | 193.1 | 193.1 | 186.6 |
| 1,4-Butylene glycol | 193.1 | 193.1 | 185.6 |
| 2-Ethylhexanol | 88.4 | 88.4 | 144.3 |
| AN | 1.02 | 1.02 | 0.98 |
| OH | 10.56 | 10.56 | 15.2 |
| Visc. (Stokes) | 65.60 | 65.60 | 20.4 |
| Treating Agent | Control | Acetic Anhydride (7.54) | MDI (3.39 wt %) |
| AN | 1.02 | 1.02 | 0.98 |
| OH | 10.56 | 1.82 | 1.68 |
| Visc. (Stokes) | 65.60 | 64.7 | 61.2 |

Each of the foregoing higher viscosity polyesters were incorporated into the formulation of Example 8 and evaluated.

| Results: | | | |
| --- | --- | --- | --- |
| Test | | | |
| Hexane Ext., % Loss | 0.21 | 0.23 | 0.20 |
| Mineral Oil Ext., % Loss | 0.40 | 0.59 | 0.36 |
| Oven Volatility, % Loss | 0.54 | 0.62 | 0.56 |
| 1% Soap H₂O Extraction (% wt loss) | 3.45 | 2.20 | 2.73 |
| Humidity Spew (Days) | 28 | 45 | 45 |

The above-tabulated results again demonstrate the unexpected improvement in performance which the modified treating agents possess.

EXAMPLE 14

Modified polyester 100-183 based on polyester 170 (Example 11) and two additional polyesters were synthesized to uniform viscosity.

|  | Polyester (Weight Parts) | | |
|---|---|---|---|
| Ingredient | 134-23-1 | 134-23-2 | 100-170 |
| Adipic Acid | 8.65 | 8.65 | 40.41 |
| Neopentyl glycol | 8.13 | 8.13 | 51.84 |
| Iso-decyl alcohol | 1.07 | 1.07 | 11.63 |
| AN | 0.39 | 0.39 | 0.40 |
| OH | 24.35 | 24.35 | 16.85 |
| Visc. (Stokes) | 34.6 | 34.6 | 13.0 |
| Treating Agent | None | Acetic Anhydride (4.87 wt %) | MDI* (3.75 wt %) |
| AN | 0.39 | 0.39 | 0.40 |
| OH | 24.35 | 2.10 | 2.40 |
| Visc. (Stokes) | 34.6 | 34.6 | 37.5 |

*Polyester 100-183 of Example 11.

Again, the formulation of Example 8 was used and the following test results recorded.

|  | Results: | | |
|---|---|---|---|
| Test | 134-23-1 | 134-23-2 | 100-170 |
| Hexane Ext., % Loss | 0.26 | 0.26 | 0.29 |
| Mineral Oil Ext., % Loss | 0.34 | 0.45 | 0.51 |
| Oven Volatility, % Loss | 0.43 | 0.39 | 0.45 |
| 1% Soap H$_2$O Extraction (% wt loss) | 2.86 | 1.91 | 0.90 |
| Humidity Spew (Days) | 99 | 118 | 118 |

Once again the performance improvement of the modified polyester is demonstrated, especially for soap resistance, humidity spew, and odor.

What is claimed is:

1. A method for improving a low acid number polyester plasticizer of the type made from a dibasic acid, a polyol, and a chain terminator wherein a molar excess of alcohol ingredients is used, the improvement which comprises subjecting said polyester to a second stage reaction with a treating agent reactive with hydroxyl groups to reduce the hydroxyl value to no more than about 4.

2. The method of claim 1 wherein said treating agent is selected from the group consisting of an anhydride, an isocyanate, ketene, epoxide, and mixtures thereof.

3. The method of claim 2 wherein said treating agent is an isocyanate.

4. The method of claim 3 wherein said isocyanate is difunctional.

5. The method of claim 1 wherein said treating agent is monofunctional.

6. The method of claim 1 wherein said treating agent is difunctional.

7. The method of claim 1 wherein said improved polyester plasticizer has a molecular weight ranging from between about 500 and about 8,000.

8. The method of claim 1 wherein said chain terminator comprises a monofunctional alcohol.

9. The method of claim 1 wherein said chain termination comprises a monofunctional carboxylic acid.

10. The method of claim 1 wherein said improved polyester plasticizer retains an acid number of less than about 3.

11. A method for improving a plasticized thermoplastic substrate which comprises incorporating into said thermoplastic substrate a low acid number, low-odor polyester plasticizer of the type made from a dibasic acid, a polyol, and a chain terminator wherein a molar excess of alcohol ingredients is used, said polyester plasticizer having been subjected to a second stage reaction with a treating agent reactive with hydroxyl groups to reduce the hydroxyl value to no more than about 4.

12. The method of claim 11 wherein said treating agent is selected from the group consisting of an anhydride, an isocyanate, a ketene, an epoxide, and mixtures thereof.

13. The method of claim 11 wherein said treating agent is mono-functional.

14. The method of claim 11 wherein said treating agent is difunctional.

15. The method of claim 14 wherein said difunctional treating agent is a diisocyanate.

16. The method of claim 11 wherein said treating agent modified polyester plasticizer has a molecular weight ranging from between about 500 and about 8,000.

17. The method of claim 11 wherein said chain terminator comprises a mono-functional alcohol.

18. The method of claim 11 wherein said chain terminator compises a mono-functional carboxylic acid.

19. The method of claim 11 wherein said thermoplastic substrate comprises a polyvinyl chloride homopolymer or copolymer.

* * * * *